US00RE43463E

(19) United States
(12) Reissued Patent
Kawasue et al.

(10) Patent Number: US RE43,463 E
(45) Date of Reissued Patent: Jun. 12, 2012

(54) THREE-DIMENSIONAL MEASURING APPARATUS AND THREE-DIMENSIONAL MEASURING METHOD

(75) Inventors: Kikuhito Kawasue, Miyazaki-gun (JP); Yuichiro Oya, Sasebo (JP)

(73) Assignee: Japan Science and Technology Agency, Kawaguchi-shi (JP)

(21) Appl. No.: 12/658,573

(22) Filed: Feb. 5, 2010

Related U.S. Patent Documents

Reissue of:
(64) Patent No.: 7,499,184
Issued: Mar. 3, 2009
Appl. No.: 11/400,269
Filed: Apr. 7, 2006

U.S. Applications:
(63) Continuation of application No. PCT/JP03/16509, filed on Dec. 22, 2003.

(30) Foreign Application Priority Data

Oct. 14, 2003 (JP) ..... 2003-354101

(51) Int. Cl.

| | |
|---|---|
| ***G01B 11/24*** | (2006.01) |
| ***G01B 11/30*** | (2006.01) |
| ***G01B 11/14*** | (2006.01) |
| ***G06K 9/00*** | (2006.01) |
| ***G01N 11/12*** | (2006.01) |
| ***G01V 8/00*** | (2006.01) |

(52) U.S. Cl. .... 356/611; 356/614; 382/154; 250/559.29

(58) Field of Classification Search ..... None
See application file for complete search history.

(56) References Cited

U.S. PATENT DOCUMENTS

| | | | | |
|---|---|---|---|---|
| 5,114,226 | A * | 5/1992 | Goodwin et al. | 356/4.09 |
| 5,867,309 | A * | 2/1999 | Spink et al. | 359/377 |
| 6,593,994 | B2 * | 7/2003 | Son et al. | 352/65 |
| 6,611,344 | B1 * | 8/2003 | Chuang et al. | 356/601 |

FOREIGN PATENT DOCUMENTS

| | | | |
|---|---|---|---|
| JP | 08-094323 | A | 4/1996 |
| JP | 11-230720 | A | 8/1999 |
| JP | 2001-012911 | A | 1/2001 |
| JP | 2003-262510 | A | 9/2003 |

* cited by examiner

*Primary Examiner* — Tarifur Chowdhury
*Assistant Examiner* — Gordon J Stock, Jr.
(74) *Attorney, Agent, or Firm* — Masuvalley & Partners

(57) ABSTRACT

The invention provides a measuring apparatus that can efficiently analyze a three-dimensional image by simultaneously recording a circular streak image and a straight-line streak image at a measured point, even when a large number of circular streak images are present. A measuring apparatus includes: a 3CCD camera; a cubic beam splitter that combines optical images incident from plural routes; a mirror that shifts an image focusing position of an optical image at a measured point by a predetermined distance; a coloring unit that applies a predetermined color to an optical image incident to a route of the beam splitter; a motor that rotates the beam splitter and the mirror in a direction of an arrowhead; and a PC that calculates a three-dimensional position of the measured point based on the optical image recorded by a camera.

5 Claims, 4 Drawing Sheets

THREE-DIMENSIONAL MEASURING APPARATUS AND THREE-DIMENSIONAL MEASURING METHOD

Matter enclosed in heavy brackets [ ] appears in the original patent but forms no part of this reissue specification; matter printed in italics indicates the additions made by reissue.

*This application is a reissue of U.S. Pat. No. 7,499,184, Ser. No. 11/400,269, filed Apr. 7, 2006, which is a continuation of PCT/JP2003/016509, filed Dec. 22, 2003, that claims priority to Japanese patent application number JP2003-354101, filed Oct. 14, 2003.*

[This application claims priority from Patent Cooperation Treaty Application Number PCT/JP2003/016509, filed 22 Dec. 2003, which claims priority from Japanese Patent Application number JP2003-354101, filed 14 Oct. 2003.]

TECHNICAL FIELD

The present invention relates to a three-dimensional measuring apparatus, and more particularly relates to a three-dimensional measuring apparatus and a three-dimensional measuring method that make it possible to carry out accurately a three-dimensional measurement at each measuring point even when plural measured points overlap with one another.

BACKGROUND ART

Conventionally, a three-dimensional measuring method that uses the principle of a stereoview using plural CCD cameras is known. According to the conventional technique, measuring points need to be matched among images recorded from different directions, and the processing of these images is complex and ambiguous.

FIG. 7 is a schematic configuration diagram of a three-dimensional measuring apparatus that is devised to solve the above conventional problem. A three-dimensional measuring apparatus 100 rotates a rotating cylinder 33 via a gear 31 that is rotated by a motor 30, thereby rotating mirrors 34 and 35 fitted to the front end of the rotating cylinder 33. With this arrangement, a camera 32 records a circular streak image 36 at a measured point 37. FIG. 8 is a schematic configuration diagram of a three-dimensional measuring apparatus according to another method. A three-dimensional measuring apparatus 200 rotates a rotating cylinder 42 via a gear 41 using a motor (not shown), thereby rotating a reflector 43 fitted to the front end of the rotating cylinder 42 with an angle. With this arrangement, a camera 40 records a circular streak image 45 of a measured point 44. By appropriately using the three-dimensional measuring apparatuses 100 and 200 according to a distance to a measuring point, a satisfactory three-dimensional measurement can be carried out when the number of measuring points is small and when the moving speed of the measuring points is slow. The three-dimensional measuring apparatus 100 is granted as Japanese Patent No. 3346662.

However, when the moving speed of the measuring points is fast, a streak image of the measuring points becomes spiral as shown in FIG. 9. In this spiral moving streak, a size variation and a pitch of a spiral streak correspond to three-dimensional velocity information. When this relation can be analyzed, three components of positions and three components of velocity can be obtained at the same time. However, according to the conventional apparatus, it is difficult to analyze overlapped streaks in the case that the number of measuring points is large.

A circular streak can be approximately analyzed by rotating a system at a sufficiently faster speed than the moving speed of the measuring points. However, an accurate analysis of a spiral image without approximation is desired.

In the light of the above problems, it is an object of the present invention to provide a three-dimensional measuring apparatus that can efficiently analyze a three-dimensional image by simultaneously recording a circular streak image and a straight-line streak image at a measured point, even when a large number of circular streak images are present.

BEST MODE FOR CARRYING OUT THE INVENTION

The present invention will be explained in detail below by way of embodiments shown in the accompanying drawings. Note that the constituent elements, kinds, combinations, shapes, and relative positions according to the embodiments are not intended to limit the range of the present invention, unless otherwise specified. The embodiments are used simply for the purpose of explanation.

Figure 1:
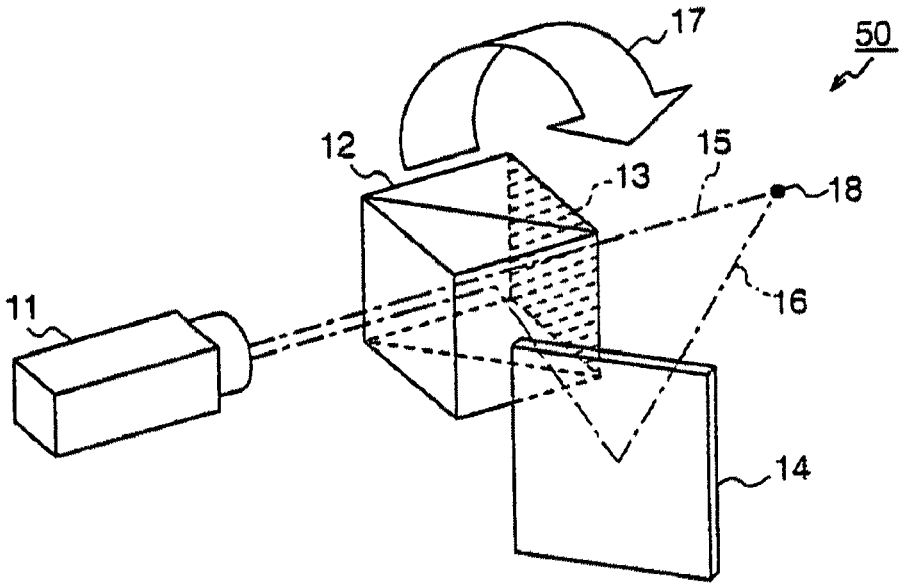
FIG. 1 is a perspective view of a configuration of main parts of a three-dimensional measuring apparatus according to an embodiment of the present invention.

FIG. 1 is a perspective view of a configuration of relevant parts of a three-dimensional measuring apparatus according to an embodiment of the present invention. A three-dimensional measuring apparatus 50 includes: a 3CCD camera (an imaging unit) configured by CCDs of three primary colors (hereinafter, simply referred to as a camera) 11; a cubic beam splitter (hereinafter, simply referred to as a beam splitter) 12 that combines optical images incident from plural routes; a mirror 14 that shifts an image forming position of an optical image at a measured point 18 by a predetermined distance; a red filter (a coloring unit) 13 that applies a predetermined color to an optical image incident to a route of the beam splitter 12; a motor (not shown) that rotates the beam splitter 12 and the mirror 14 in a direction of an arrowhead 17; and a PC (not shown) that calculates a three-dimensional position of the measured point 18 based on the optical image recorded by the camera 11. While the red filter 13 is used for the coloring unit, other colors can be also used. The rotation direction of the motor can be opposite to the direction explained herein.

Figure 2:
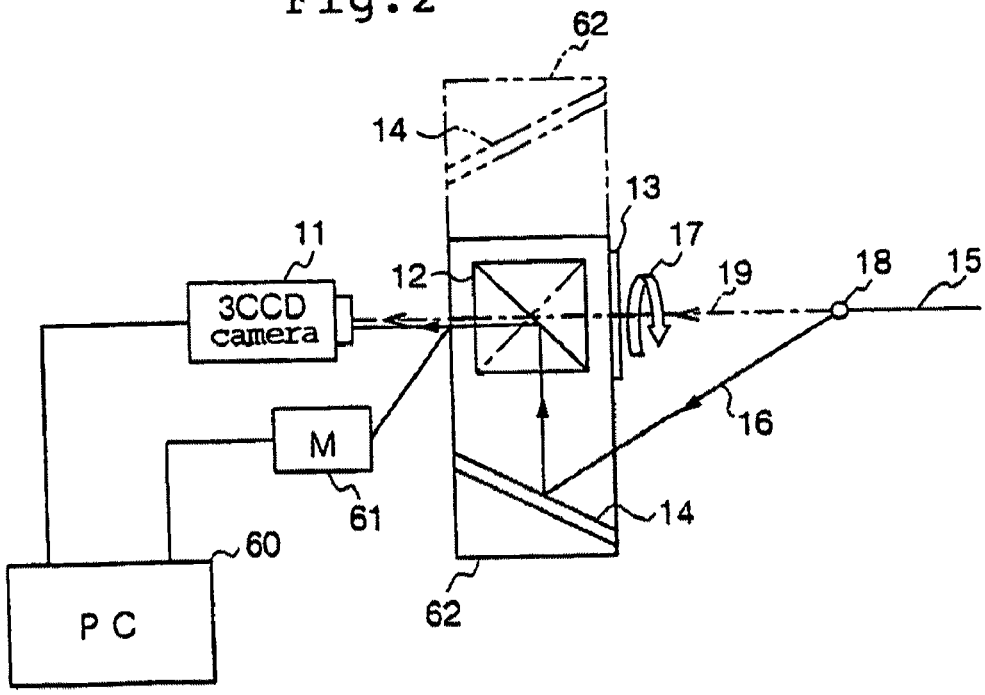
FIG. 2 is a block diagram of a total configuration of the three-dimensional measuring apparatus according to the invention.

FIG. 2 is a block diagram of a total configuration of the three-dimensional measuring apparatus according to the invention. Constituent elements that are the same as those in FIG. 1 are assigned with like reference numerals, and a redundant explanation is omitted. In this configuration, the beam splitter 12 and the mirror 14 are integrated into a rotating cylinder 62, and are rotated in the direction of the arrowhead 17 by a motor (a rotating unit) 61 around an optical axis 15 of the camera 11. A PC (a calculating unit) 60 detects the image recorded by the camera 11, and processes the image. The PC 60 also controls a detection of the rotation angle of the motor 61.

Figure 3:
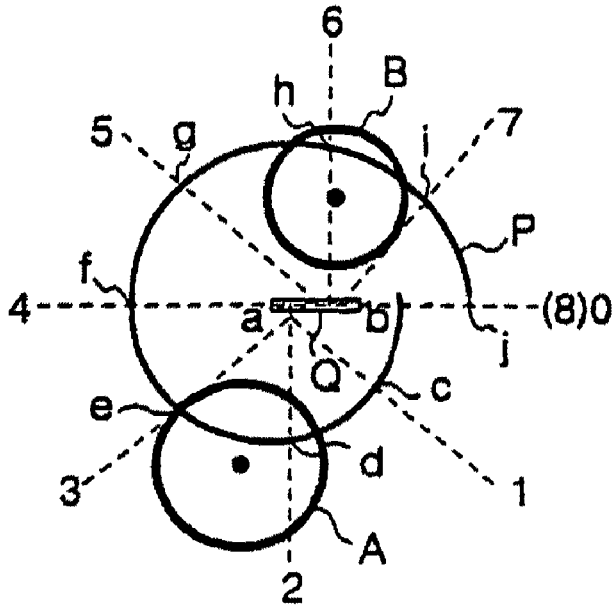
FIG. 3 is a diagram of phases of a spiral corresponding to points on a center line according to the invention.

The outline operation of the three-dimensional measuring apparatus according to the embodiment is explained below with reference to FIG. 2. The beam splitter 12 and the mirror 13 are integrated together, and are rotated at a high speed (for example, 3,600 r/min) around the optical axis 15 of the camera 11. A high-speed hollow-shaft pulse motor is used to drive the integrated combination of the beam splitter 12 and the mirror 13. The camera 11 is incorporated in the hollow part of the hollow-shaft pulse motor, thereby miniaturizing the system. Light 16 that is reflected by the mirror 14 and is imaged and is shifted by the optical axis 15. Therefore, this light forms a circular (spiral) streak like the light formed by the conventional apparatus. Light 19 that proceeds straight through the beam splitter 12 forms a point (a straight line) which shows the center of the circular streak. The light 19 that proceeds straight through the beam splitter 12 passes through the color filter 13. The color camera 11 images this light so that the light can be easily identified by its color. In other words, as shown in FIGS. 2 and 3, the measured point 18 is imaged as a combination of a circular (spiral: when the movement is fast) streak P based on the circular shift, and a straight-line streak Q which shows a two-dimensional position (movement) . These two kinds of streaks can be easily identified by processing the images in color. A direction of the straight-line streak Q that shows the center of the streak can be identified based on a winding direction of the spiral streak P (as explained in detail later).

When a pulse motor is used for the motor to analyze the spiral streak, a rotation angle of the pulse motor is necessary at the starting point and the ending point of the imaged streak. A counter is reset to zero at a Z phase of the pulse motor. Then, the counter counts the pulse. The PC 60 reads the output of the counter when a vertical synchronization signal of the image signal is generated, thereby detecting a drawing starting position (a direction) and a drawing ending position (a direction) of the spiral. The detected values become information to be used to automatically analyze the spiral.

FIG. 3 is a diagram of phases of the spiral corresponding to points on the center line. The direction of the straight-line streak Q showing the center of the streak can be identified based on the winding direction of the spiral streak. In other words, when the rotation direction of the beam splitter 12 and the mirror 14 is the counterclockwise direction, the spiral streak on the recorded image becomes in the clockwise rotation. Therefore, it is clear that the measured point 18 shifts from left (a) to right (b) in FIG. 3. The PC 60 first recognizes the straight-line streak Q that shows the center of the streak, based on a labeling processing, and measures a three-dimensional motion state of the measured point 18 based on the corresponding spiral streak P. Within a short time of one rotation of the apparatus, the measured point (a tracer particle) 18 can be assumed as substantially a constant-speed motion. Considering the fact that the apparatus also rotates at a constant speed, phases of the spiral streak corresponding to respective intersecting points (c to j) on the straight-line streak Q showing the center can be determined as those shown in FIG. 3. In other words, while a point on the straight-line streak Q showing the center in FIG. 3 shifts from the point a to the point b, the point shifts in the direction of 0, 1, 2, . . . , 7, and (8) on the spiral streak.

Figure 4:
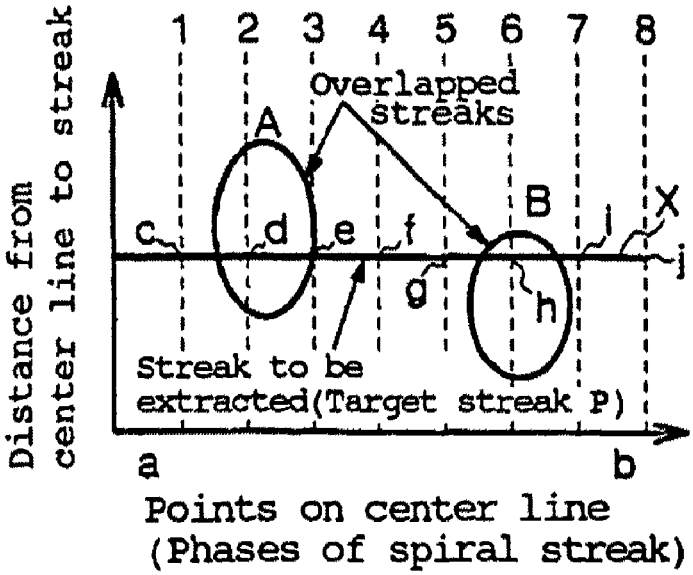
FIG. 4 is a distribution diagram of a distance between a point on a target straight-line streak Q and a point on a spiral streak P corresponding to the point on the streak Q (between points c and j in corresponding phase directions) according to the invention.

FIG. 4 is a distribution diagram of a distance between a point on the target straight-line streak Q and a point on the spiral streak P corresponding to the point on the streak Q (between the points c and j in corresponding phase directions). The vertical axis represents a distance from the center line Q to the streak P, and the horizontal axis represents points on the center line Q. A streak to be extracted along a target straight-line streak P becomes a straight line X in the graph. A streak A and a streak B become an ellipse in the graph. Therefore, even when many streaks are overlapped, a spiral can be effectively extracted, and the three-dimensional motion state can be analyzed. These processes are carried out for all labeled center points (a center straight line).

As explained above, since the three-dimensional measuring apparatus 50 according to the present embodiment uses the beam splitter 12, it is possible to simultaneously record the straight-line streak image Q (a direct image at the measured point 18) as well as the conventional circular streak image. Further, the color film 13 is fitted to the surface of the beam splitter 12 to which the straight-line streak image is incident, thereby coloring the incident optical image. Consequently, the circular streak image P and the straight-line streak image Q can be identified separately by processing these images with the PC 60. The three-dimensional measuring apparatus further includes the PC 60 that calculates a three-dimensional position based on the circular streak image P and the straight-line streak image Q recorded by the camera 11.

Figure 5:
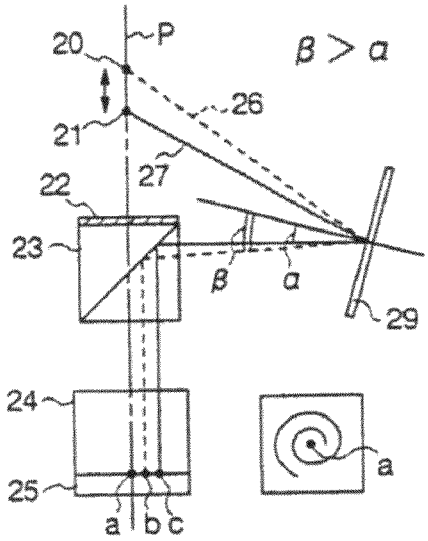
FIG. 5(a) is an explanatory diagram of a relation between a distance of a measured point and a streak image.
FIG. 5(b) is an explanatory diagram of a relation between a mirror position and a streak image.
Figure 5:
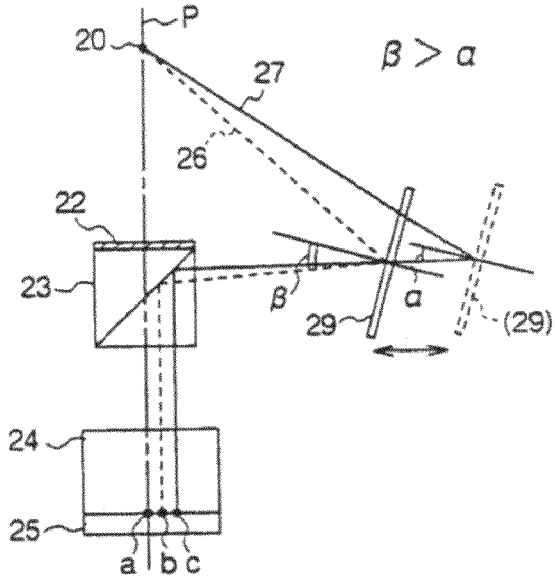

FIG. 5(a) is an explanatory diagram of a relation between a distance of a measured point and a streak image. First, a relation between a distance of a measured point and a streak image when the measured point moves from a point 20 to a point 21 is explained. A mirror 29 reflects light 26 from the measured point 20 to a beam splitter 23 at a reflection angle $\beta$. The light is further reflected from the beam splitter 23 to a light-receiving surface 25 of a camera 24 and forms an image at a point b. Light from an optical axis P passes through a color filter 22, reaches the light-receiving surface 25 of the camera 24, and forms an image at a point a. When the measured point moves to the point 21, light 27 of the measured point 21 is reflected from the mirror 29 to the beam splitter 23 at a reflection angle $\alpha$. The light is further reflected from the beam splitter 23 to the light-receiving surface 25 of the camera 24, and forms an image at a point c. An important point herein is that the reflection angles $\beta$ and $\alpha$ have a relation of $\beta>\alpha$, and therefore, when a distance between the measured point and the light-receiving surface 25 becomes long (when the measured point is the point 20), the shift amount becomes small. When a distance between the measured point and the camera becomes short (when the measured point is the point 21), the shift amount becomes large. As a result, when it is assumed that the measured point does not shift to left and right directions, a spiral streak is imaged around the point a as shown at the right lower side in FIG. 5(a).

FIG. 5(b) is an explanatory diagram of a relation between a mirror position and a streak image. Constituent elements that are the same as those in FIG. 5(a) are assigned with like reference numerals. A relation between a mirror position and a streak image when the mirror moves from a position 29 to a position (29) is explained. The mirror 29 reflects the light 26 from the measured point 20 to the beam splitter 23 at the reflection angle β. The light is further reflected from the beam splitter 23 to the light-receiving surface 25 of the camera 24 and forms an image at the point b. The light from the optical axis P passes through the color filter 22, reaches the light-receiving surface 25 of the camera 24, and forms an image at the point a. When the mirror shifts to the position (29), the light 27 of the measured point 20 is reflected from the mirror at the position (29) to the beam splitter 23 at the reflection angle α. The light is further reflected from the beam splitter 23 to the light-receiving surface 25 of the camera 24, and forms an image at the point c. An important point herein is that the reflection angles β and α have a relation of β>α, and therefore, when a distance between the mirror and the beam splitter 23 becomes long (when the mirror is at the position (29)), the shift amount becomes large. When a distance between the mirror and the beam splitter 23 becomes short (when the mirror is at the position 29), the shift amount becomes small. As explained above, a shift amount of the image can be changed by changing a distance between the mirror and the beam splitter. Therefore, a measurement can be achieved according to a distance of a target. In other words, a shift amount of the image can be changed by changing a distance between the mirror 29 and the beam splitter 23. Therefore, a measurement can be achieved according to a distance of the measured point 20. For example, when the mirror 29 is fixed to the beam splitter 23, the shift amount becomes small and a measurement becomes impossible when the measured point becomes far. In this case, the shift amount can be increased by increasing a distance between the mirror 29 and the beam splitter 23, thereby making it possible to achieve a measurement.

Figure 6:
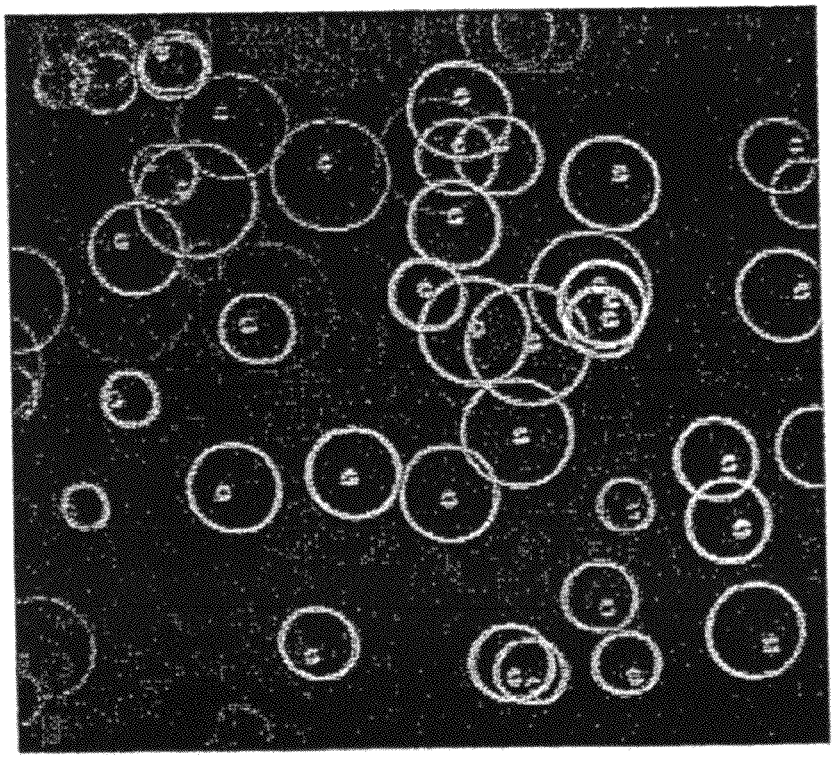
FIG. 6 is a diagram of an image of tracer particles in a fluid that is imaged by a test unit of the three-dimensional measuring apparatus according to the invention.
Figure 7:
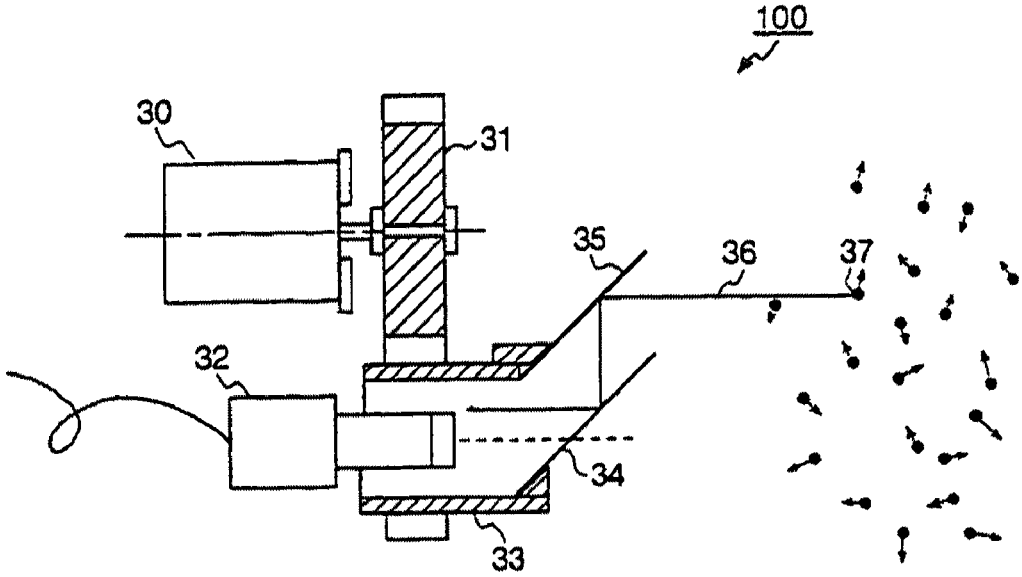
Fig.7 Prior Art
FIG. 7 is a schematic configuration diagram of a conventional three-dimensional measuring apparatus.
Figure 8:
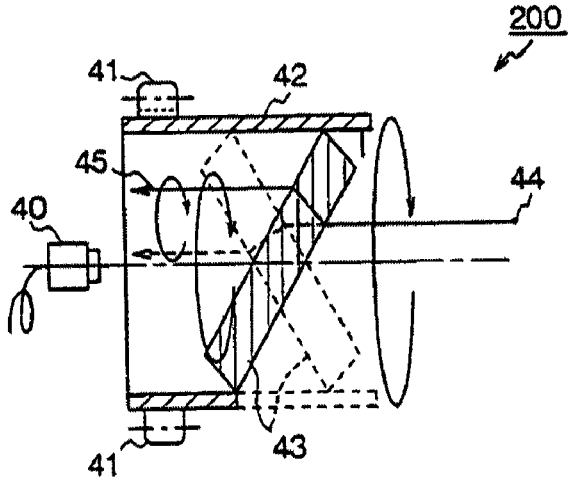
Fig.8 Prior Art
FIG. 8 is a schematic configuration diagram of a conventional three-dimensional measuring apparatus according to another method.
Figure 9:
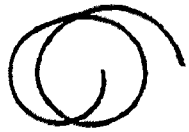
Fig.9 Prior Art
FIG. 9 is a diagram showing that a streak image of measuring points becomes a spiral streak.

FIG. 6 is a diagram of an image of tracer particles in a fluid that is imaged by a test unit of the three-dimensional measuring apparatus according to the invention. It is clear from this image that a center point (a straight-line streak) and a circular streak of each tracer particle can be clearly identified and that it is easy to identify each streak from overlapped streak images that are present at the center of the image.

According to the invention, by using the beam splitter, the conventional circular streak image and the colored straight-line streak image can be recorded in combination, thereby making it possible to specify many overlapped circular streak images.

According to the invention, since the imaging unit records the colored straight-line streak image and the circular streak image, a moving distance and a direction of the measured point can be calculated from the straight-line streak image, and a distance from the circular streak image to the measured point calculated.

According to the invention, a center of a circular streak image is obtained from a straight-line streak image recorded by the imaging unit, thereby extracting a circular streak image corresponding to the center.

According to the invention, since a distance between the mirror and the beam splitter can be changed, a shift amount of the circular streak image can be adjusted based on the distance of the measured point.

According to the invention, when the rotating unit is a pulse motor, the calculating unit calculates a rotation angle of the pulse motor at the starting point and the ending point of the circular streak image.

Therefore, a drawing starting position (a direction) and a drawing ending position (a direction) of the spiral can be detected. The detected information can be used for the automatic analysis of the spiral.

The present invention provides a three-dimensional measuring apparatus that carries out a three-dimensional measuring of a measured point, said three-dimensional measuring apparatus comprising: an imaging unit that can detect at least two kinds of colors; a beam splitter that combines optical images that are incident from a plurality of routes; a mirror that slides, an image forming position of an optical image at said measured point by a predetermined distance; a coloring unit that applies a predetermined color to an optical image incident to a route of said beam splitter; a rotating unit that rotates said beam splitter and said mirror at a predetermined rotational velocity; and a calculating unit that calculates a three-dimensional position of said measured point based on an optical image recorded by said imaging unit.

According to the present invention, a beam splitter is used to make it possible to simultaneously record a straight-line streak image (a direct image at a measured point) and the conventional circular streak image. Further, a color film is fitted to a surface of the beam splitter to which the straight-line streak image is incident, thereby coloring the incident optical image. Consequently, the circular streak image and the straight-line streak image can be identified separately by processing these images. The three-dimensional measuring Apparatus further includes a calculating unit that calculates a Three-dimensional position based on the circular streak image and The straight-line streak image recorded by the imaging unit.

According to the present invention, by using the beam splitter, the conventional circular streak image and the colored straight-line streak image can be recorded in combination, it is possible to specify many overlapped circular streak images. Therefore, a three-dimensional image can be analyzed efficiently.

The invention provides the three-dimensional measuring apparatus, wherein said calculating unit obtains, from said imaging unit, a straight-line streak image at said measured point that has passed through said coloring unit and a circular streak image from said mirror that is rotated by said rotating unit, thereby calculating a moving direction of said measured point and a distance to said measured point, and thereby measuring a three-dimensional position and a moving velocity of said measured point.

The imaging unit detects a colored straight-line streak image and a circular streak image. For example, a color camera having CCDs of three primary colors detects a colored straight-line streak image and a circular streak image at the measured point. The calculating unit detects an image signal with a PC or the like, calculates a moving distance and a direction of the measured point using the straight-line streak image, and calculates a distance to the measured point using the circular streak image. The calculating unit can obtain a three-dimensional position of the measured point from the result of the calculations.

According to the present invention, since the imaging unit detects the colored straight-line streak image and the circular streak image, the calculating unit can calculate a moving distance and a direction of the measured point from the straight-line streak image, and calculate a distance to the measured point from the circular streak image. The calculating unit can both obtain a three-dimensional position of the measured point from the result of the calculation, and simultaneously identify each measured point.

The invention provides the three-dimensional measuring apparatus, wherein said calculating unit obtains a center of said circular streak image from said straight-line streak image recorded by said imaging unit, and extracts a circular streak image corresponding to said center, thereby making it possible to identify a specific circular streak image from among a plurality of circular streak images.

When a large number of circular streak images are overlapped, in order to identify each circular streak image, a center of a circular streak image is recognized first by the color image processing, and a circular streak image corresponding to the center is extracted. With this arrangement, the analysis can be carried out efficiently, even when a large number of circular streaks are present within an image.

According to the present invention, a center of a circular streak image is obtained from a straight-line streak image recorded by the imaging unit, thereby extracting a circular streak image corresponding to the center. With this arrangement, the analysis can be carried out efficiently, even when a large number of circular streaks are present within an image.

The invention provides the three-dimensional measuring apparatus, wherein a distance between said mirror and said beam splitter can be changed to make it possible to adjust a shift amount of said circular streak image.

Since the shift amount of an image can be changed by changing the distance between the mirror and the beam splitter, a measuring can be carried out according to a distance of a target. For example, when the mirror is fixed to the beam splitter, a shift amount becomes small when the measured point is far. This makes it impossible to carry out a measuring. In this case, by increasing the distance between the mirror and the beam splitter, the shift amount increases, and it becomes possible to carry out a measuring.

According to the present invention, since a distance between the mirror and the beam splitter can be changed, a shift amount of the circular streak image can be adjusted based on the distance of the measured point.

The invention provides the three-dimensional measuring apparatus, wherein when said rotating unit is a pulse motor that rotates based on a phase difference of a pulse, said calculating unit calculates a rotation angle of said pulse motor at a starting point and an ending point respectively of said circular streak image, thereby detecting a position at said starting point and a position at said ending point of said circular streak image.

In order to analyze a spiral streak, a rotation angle of the pulse motor at the starting point and the ending point of a streak to be imaged is necessary. A counter is reset to zero at a Z phase of the pulse motor, and the counter counts the pulse. An output of the counter, when a vertical synchronization signal of an image signal is generated, is read into a personal computer. With this arrangement, a drawing starting position (a direction) and a drawing ending position (a direction) of the spiral can be detected. The detected information can be used for the automatic analysis of the spiral.

According to the present invention, when the rotating unit is a pulse motor, the calculating unit calculates a rotation angle of the pulse motor at the starting point and the ending point of the circular streak image. Therefore, a drawing starting position (a direction) and a drawing ending position (a direction) of the spiral can be detected. The detected information can be used for the automatic analysis of the spiral.

What is claimed is:

1. A measuring apparatus that carries out a three-dimensional measuring of a measured point, the measuring apparatus comprising:

an imaging unit that can detect at least two colors;

a beam splitter that combines at least two optical images that are incident from a plurality of routes;

a moveable mirror that shifts an image forming position of an optical image at the measured point by a predetermined distance;

a coloring unit that applies a predetermined color to an optical image incident to a route of the beam splitter;

a rotating unit that rotates the beam splitter and the mirror at a predetermined rotational velocity; and a calculating unit that calculates a three-dimensional position of the measured point based on an optical image recorded by the imaging unit.

2. The measuring apparatus according to claim 1, wherein the calculating unit obtains, from the imaging unit, a straight-line streak image at the measured point that has passed through the coloring unit and a circular streak image from the mirror that is rotated by the rotating unit, thereby calculating a moving direction of the measured point and a distance to the measured point, and thereby measuring a three-dimensional position and a moving velocity of the measured point.

3. The measuring apparatus according to claim 2, wherein the calculating unit obtains a center of the circular streak image from the straight-line streak image recorded by the imaging unit, and extracts a circular streak image corresponding to a center, thereby making it possible to identify a specific circular streak image from among a plurality of circular streak images.

4. The measuring apparatus according to claim 1, wherein a distance between the mirror and the beam splitter can be changed to make it possible to adjust a shift amount of a circular streak image.

5. The measuring apparatus according to claim 1, wherein when the rotating unit is a pulse motor that rotates based on a phase difference of a pulse, the calculating unit calculates a rotation angle of the pulse motor at a starting point and an ending point respectively of a circular streak image, thereby detecting a position at the starting point and a position at the ending point of the circular streak image.

* * * * *